# (12) United States Patent
Kong et al.

(10) Patent No.: US 12,252,075 B2
(45) Date of Patent: Mar. 18, 2025

(54) SYSTEM FOR DRIVING DIGITAL SIDE MIRROR FOR VEHICLES

(71) Applicants: Hyundai Motor Company, Seoul (KR); Kia Corporation, Seoul (KR); SMR Automotive Modules Korea Ltd., Cheongju-si (KR)

(72) Inventors: Nak Kyoung Kong, Seongnam-Si (KR); Ki Hong Lee, Seoul (KR); Dae Hee Lee, Incheon (KR); Jong Min Park, Seoul (KR); Won Sik Hong, Incheon (KR); Houng Young Shin, Incheon (KR); Chang Hwan Lim, Seoul (KR); Sung Min Cho, Siheung-Si (KR); Baek Joon Kwon, Suwon-Si (KR)

(73) Assignees: Hyundai Motor Company, Seoul (KR); Kia Corporation, Seoul (KR); SMR Automotive Modules Korea Ltd., Cheongju-si (KR)

( * ) Notice: Subject to any disclaimer, the term of this patent is extended or adjusted under 35 U.S.C. 154(b) by 224 days.

(21) Appl. No.: 18/085,040

(22) Filed: Dec. 20, 2022

(65) Prior Publication Data
US 2023/0398950 A1 Dec. 14, 2023

(30) Foreign Application Priority Data
Jun. 10, 2022 (KR) .......................... 10-2022-0070474

(51) Int. Cl.
*B60R 11/04* (2006.01)
*H04N 23/51* (2023.01)
(Continued)

(52) U.S. Cl.
CPC ............. *B60R 11/04* (2013.01); *H04N 23/51* (2023.01); *B60Q 1/52* (2013.01); *B60Q 5/005* (2013.01);
(Continued)

(58) Field of Classification Search
CPC ..... B60R 1/00; B60R 1/12; B60R 2001/1253; B60R 1/26; B60R 11/04;
(Continued)

(56) References Cited

U.S. PATENT DOCUMENTS

| 9,457,733 B2 | 10/2016 | Schutz |
| 2017/0050568 A1* | 2/2017 | Sobecki ................. B60Q 9/008 |

(Continued)

FOREIGN PATENT DOCUMENTS

| KR | 1998048507 U | 9/1998 |
| KR | 1020120042220 A | 5/2012 |
| KR | 1020130128793 A | 11/2013 |

*Primary Examiner* — Masum Billah
(74) *Attorney, Agent, or Firm* — Morgan, Lewis & Bockius LLP (57) ABSTRACT

A system for driving a digital side mirror for vehicles, includes a moving case accommodating a camera for photographing the area surrounding the rear and the sides of a vehicle which is mounted in a housing and in a guide pipe mounted to a vehicle panel to be movable forwards and backwards thereof, wherein the camera accommodated in the moving case is controlled to photograph the area surrounding the rear and the sides of the vehicle even when the moving case is moved backwards and received in the housing and the guide pipe, facilitating a user to easily monitor the area surrounding the rear and the sides before turning on the vehicle or after turning off the vehicle.

19 Claims, 6 Drawing Sheets

(51) Int. Cl.
  *B60Q 1/52*      (2006.01)
  *B60Q 5/00*      (2006.01)
  *B60R 1/25*      (2022.01)
  *B60R 1/26*      (2022.01)
  *B60R 11/00*     (2006.01)

(52) U.S. Cl.
  CPC . *B60R 1/25* (2022.01); *B60R 1/26* (2022.01); *B60R 2011/0082* (2013.01); *B60R 2011/0092* (2013.01); *B60R 2300/8046* (2013.01)

(58) Field of Classification Search
  CPC ....... B60R 2011/0092; B60R 2300/105; B60R 2300/20; B60R 2300/8046; B60R 1/06
  USPC ......................................... 348/148
  See application file for complete search history.

(56) References Cited

U.S. PATENT DOCUMENTS

| | | | |
|---|---|---|---|
| 2019/0023194 A1* | 1/2019 | Ghannam | ............. H04N 23/57 |
| 2019/0161014 A1  | 5/2019 | Ko et al. | |
| 2020/0164804 A1* | 5/2020 | Kaneko | ................ B60R 1/0602 |

* cited by examiner

SYSTEM FOR DRIVING DIGITAL SIDE MIRROR FOR VEHICLES

CROSS-REFERENCE TO RELATED APPLICATION

The present application claims priority to Korean Patent Application No. 10-2022-0070474 filed on Jun. 10, 2022, the entire contents of which is incorporated herein for all purposes by this reference.

BACKGROUND OF THE PRESENT DISCLOSURE

Field of the Present Disclosure

The present disclosure relates to a system for driving a digital side mirror for vehicles, and more particularly to a system for driving a digital side mirror for vehicles which is configured for moving a camera for photographing the area surrounding the rear and the sides of a vehicle forwards outside a door panel or moving the same backwards to a stowed position.

Description of Related Art

In general, a side mirror is mounted on the external side surface of a front door of a vehicle so that a driver can monitor the area surrounding the rear and the sides of the vehicle.

However, a typical conventional side mirror protrudes a predetermined length from a front door of a vehicle, and thus leads to problems, such as deterioration in fuel efficiency due to air resistance, inconvenience in which a driver turns his or her head to monitor the area surrounding the rear and sides, and complexity of design of a door panel.

Recently, to solve the aforementioned problems with the conventional side mirror, a digital side mirror system, which includes a camera mounted to a door panel of a vehicle and a display mounted in the interior of the vehicle to display an image of the area surrounding the rear and the sides captured by the camera, has been developed and used.

However, a conventional digital side mirror system has the following problems.

First, because the camera, which is a main component of the digital side mirror system, is fixed in the state of being exposed outside while the vehicle is parked, there is a risk of the camera being damaged by external impacts or stolen.

Second, because the camera and sensors, which are manufactured with high precision, are vulnerable to changes in external environment and impacts, there is the concern of contamination or malfunction due to exposure to outside.

Third, in the case in which the camera is received in the door panel or the like to prevent malfunction, damage, or theft, it is impossible for the camera to photograph the area surrounding the rear and the sides of the vehicle, thus making it impossible for the driver to monitor the area surrounding the rear and the sides of the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a system for driving a digital side mirror for vehicles, in which a moving case accommodating a camera for photographing the area surrounding the rear and the sides of a vehicle is mounted in a housing and in a guide pipe mounted to a door panel to be movable forwards and backwards and in which the camera accommodated in the moving case is controlled to photograph the area surrounding the rear and the sides of the vehicle even when the moving case is moved backwards and received in the guide pipe, facilitating a user to easily monitor the area surrounding the rear and the sides before turning on the vehicle or after turning off the vehicle.

Various aspects of the present disclosure are directed to providing a system for driving a digital side mirror for vehicles, including a housing mounted to a panel of a vehicle, a guide pipe extending from the housing to protrude outside the panel of the vehicle, a moving case inserted into the housing and the guide pipe to be movable forwards and backwards thereof, a first camera mounted in the moving case to photograph the area surrounding the rear and the sides of the vehicle, and a driving device mounted to the housing and engaged to the moving case to linearly move the moving case into or out of the guide pipe. The guide pipe is provided with a transparent lens to allow the first camera to photograph the area surrounding the rear and the sides of the vehicle through the transparent lens when the moving case is received in the guide pipe.

In an exemplary embodiment of the present disclosure, the moving case may have an external photographing opening formed in the rear surface thereof to define the field of view of the lens of the first camera.

In another exemplary embodiment of the present disclosure, the system may further include a second camera mounted in the moving case to photograph the ground in the area surrounding the sides of the vehicle, and the moving case may have an external photographing opening formed in the lower surface thereof to define the field of view of the lens of the second camera.

In yet another exemplary embodiment of the present disclosure, the system may further include a direction-indicating lens mounted on the external side surface of the moving case and a direction-indicating lamp mounted in the moving case to radiate light through the direction-indicating lens.

In yet another exemplary embodiment of the present disclosure, the transparent lens may be mounted on the rear surface of the guide pipe to be aligned with the lens of the first camera in the forward-backward direction to enable the first camera to photograph the area surrounding the rear and the sides in the state in which the moving case is moved backwards and received in the guide pipe.

In still yet another exemplary embodiment of the present disclosure, the system may further include a first gasket mounted between the periphery of the guide pipe and the panel of the vehicle to ensure watertightness and prevent introduction of foreign substances therebetween.

In a further exemplary embodiment of the present disclosure, the driving device may include a motor mounted to the lower portion of the housing, a connection frame including an external end portion connected to the moving case and an internal end portion located in a lower open portion in the housing, a sector gear mounted to the output shaft of the motor, and a rack gear formed on the lower surface of the internal end portion of the connection frame to be engaged with the sector gear.

In another further exemplary embodiment of the present disclosure, the connection frame may include a slide step formed on the internal end portion thereof, and the housing may have a slide groove formed in the lower open portion therein to allow the slide step to be linearly movably fitted therein.

In yet another further exemplary embodiment of the present disclosure, the system may further include a controller electrically connected to the driving device and the first camera and configured to control driving of the driving device and the first camera depending on whether the vehicle is in an ON state or an OFF state.

In yet another further exemplary embodiment of the present disclosure, the controller may be configured to perform control so that the first camera is maintained in an ON state for a predetermined amount of time after the vehicle is turned off in the state in which the moving case including the first camera mounted therein is drawn out of the guide pipe.

In still yet another further exemplary embodiment of the present disclosure, the controller may be configured to apply a drive signal to the driving device to move the moving case into the guide pipe when a predetermined time period elapses after the vehicle is turned off.

In a still further exemplary embodiment of the present disclosure, the controller may be configured to perform control so that the ON state of the first camera is further maintained for a predetermined amount of time after the moving case is moved into the guide pipe by driving of the driving device.

In a yet still further exemplary embodiment of the present disclosure, the controller may be configured to turn on the first camera in response to a mobile operation signal generated by operation of a mobile device by a user in the parked state of the vehicle and to transmit an image of the area surrounding the vehicle captured by the first camera to the mobile device of the user.

In a yet still further exemplary embodiment of the present disclosure, the controller may be configured to perform control so that an emergency light is turned on or a horn is driven upon determining that a risk factor is present in the image of the area surrounding the vehicle captured by the first camera.

In a yet still further exemplary embodiment of the present disclosure, the system may further include a second gasket mounted as a seal on a predetermined portion of the internal surface of the housing to be in contact with the moving case to ensure watertightness and prevent introduction of foreign substances therebetween.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Other aspects and exemplary embodiments of the present disclosure are discussed infra.

The above and other features of the present disclosure are discussed infra.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, reference will now be made in detail to various embodiments of the present disclosure, examples of which are illustrated in the accompanying drawings and described below.

Figure 1:
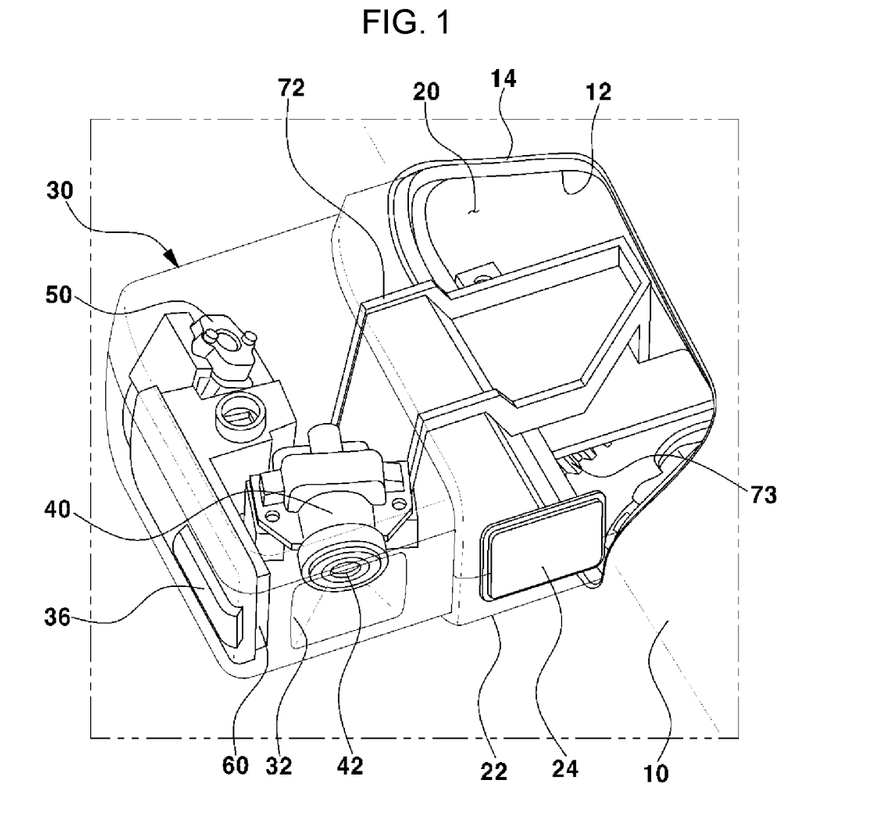
FIG. 1 is a perspective view showing a moving case and components mounted in the moving case in a system for driving a digital side mirror for vehicles according to an exemplary embodiment of the present disclosure.
Figure 2:
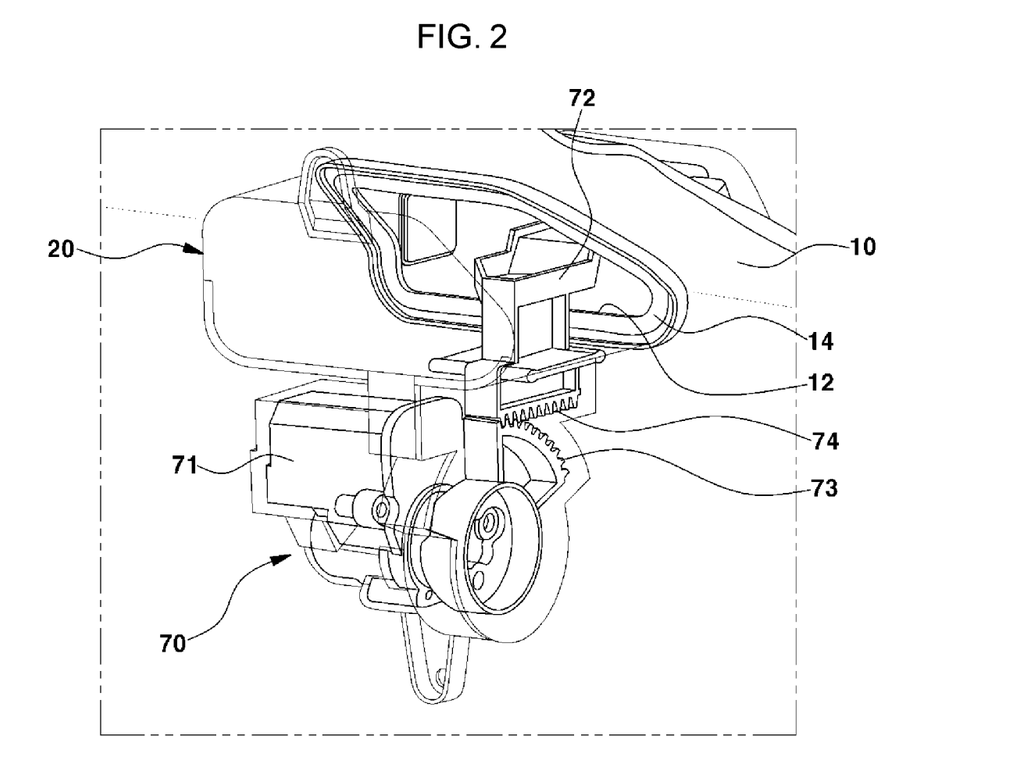
FIG. 2 is a perspective view showing a driving device of the system for driving a digital side mirror for vehicles according to an exemplary embodiment of the present disclosure.
Figure 3:
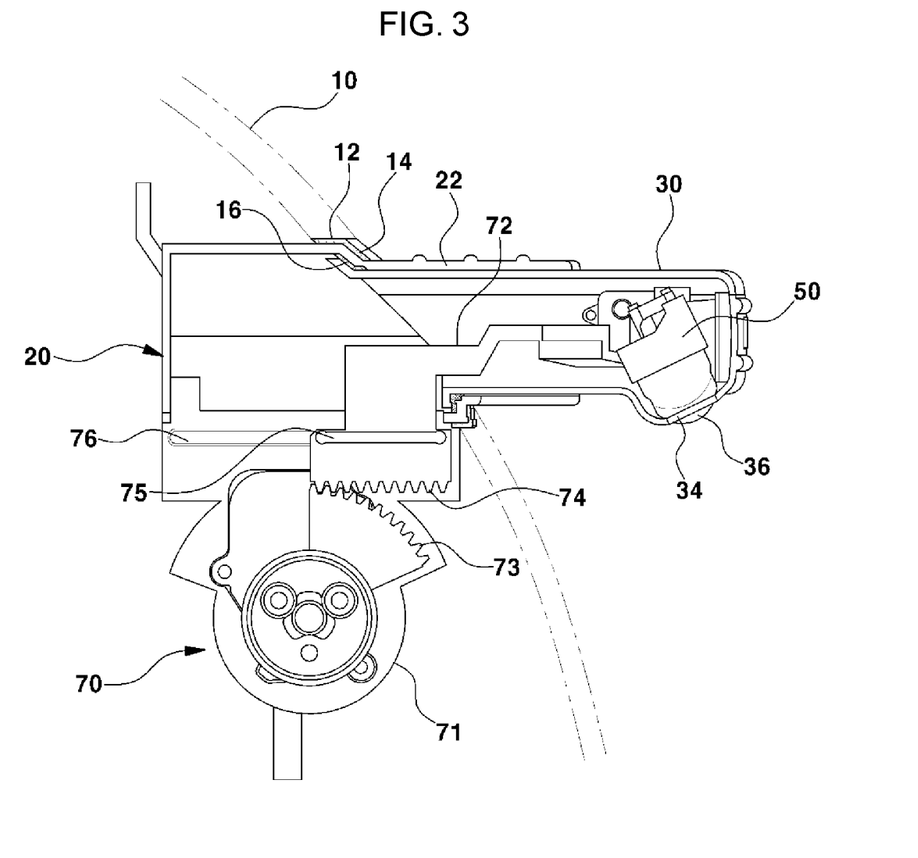
FIG. 3 is a cross-sectional view showing the system for driving a digital side mirror for vehicles according to an exemplary embodiment of the present disclosure.
Figure 4:
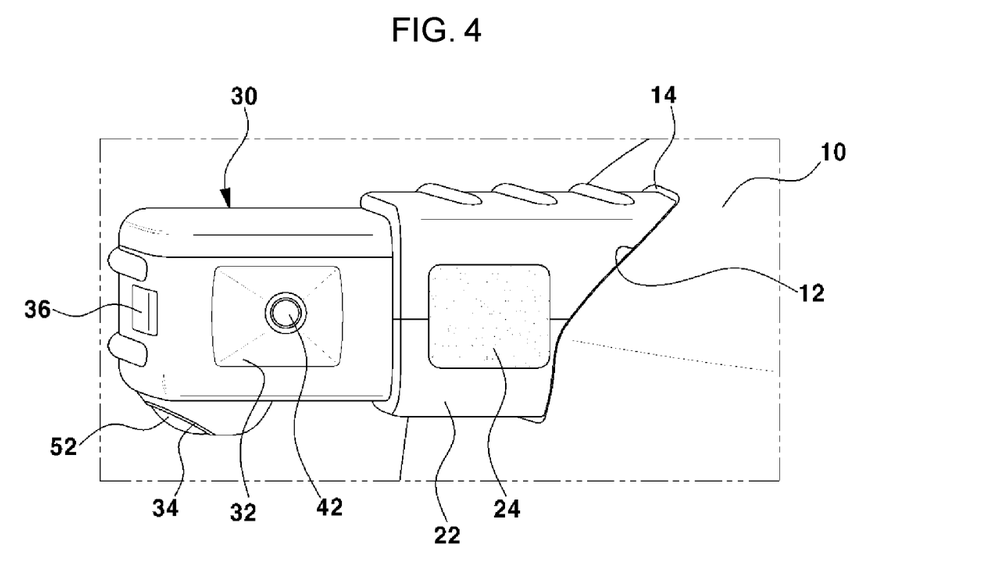
FIG. 4 is a perspective view showing the state in which the moving case is drawn out of a guide pipe in the system for driving a digital side mirror for vehicles according to an exemplary embodiment of the present disclosure.
Figure 5:
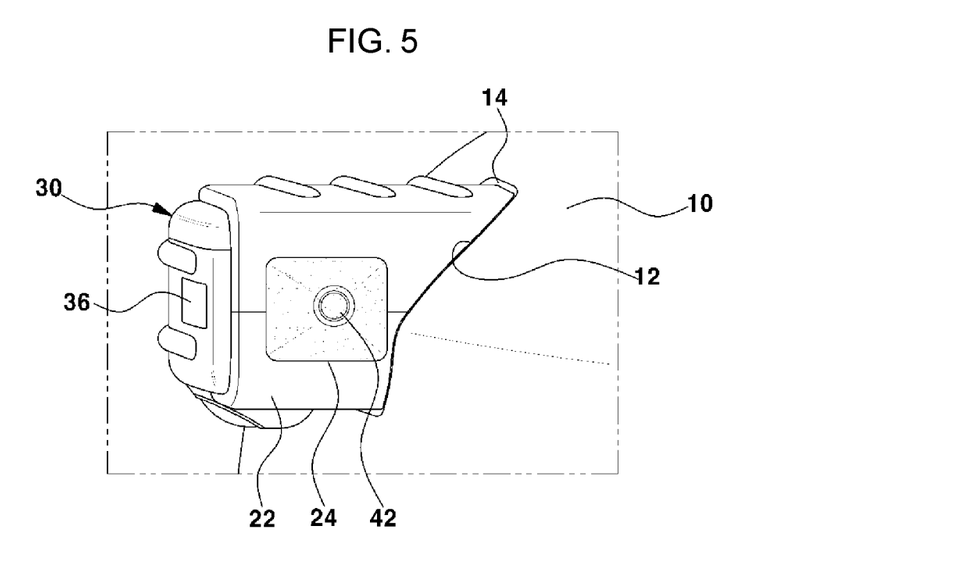
FIG. 5 is a perspective view showing the state in which the moving case is received in the guide pipe in the system for driving a digital side mirror for vehicles according to an exemplary embodiment of the present disclosure.

FIG. 1, FIG. 2, and FIG. 3 show the mounted state of a system for driving a digital side mirror for vehicles according to an exemplary embodiment of the present disclosure, FIG. 4 shows the state in which a moving case is drawn out of a guide pipe in the system for driving a digital side mirror for vehicles according to an exemplary embodiment of the present disclosure, and FIG. 5 shows the state in which the moving case is received in the guide pipe in the system for driving a digital side mirror for vehicles according to an exemplary embodiment of the present disclosure.

As shown in FIG. 1, FIG. 2, FIG. 3, FIG. 4, and FIG. 5, a housing 20 including a predetermined volume is mounted inside a door panel 10, among the panels of a vehicle, and a guide pipe 22 is integrally formed with the housing 20 to extend from the housing 20 and to protrude outside the door panel 10.

Alternatively, the guide pipe 22 may be provided separately from the housing 20, and may be connected to the housing 20 to protrude outside the door panel 10.

To the present end, a mounting hole 12 is formed in the door panel 10, and the housing 20 is mounted inside the door panel 10 through the mounting hole 12. The guide pipe 22, which is integrated with the housing 20, extends through the mounting hole 12 to protrude outside the door panel 10.

In the instant case, a first gasket 14 is mounted between the periphery of the guide pipe 22 and the mounting hole 12 in the door panel 10 to prevent the entry of water or other foreign substances.

The first gasket 14 may be mounted on the internal circumferential surface of the mounting hole 12 in the door panel 10 to be in close contact with the periphery of the guide pipe 22, ensuring watertightness.

A moving case 30, in which the first camera 40 for photographing the area surrounding the rear and the sides of the vehicle is accommodated, is mounted in the guide pipe 22 and the housing 20 to move in and out of the same.

In more detail, in the state in which the moving case 30, in which the first camera 40 is accommodated, is inserted into both the guide pipe 22 and the housing 20, the moving case 30 may be moved forwards and drawn out of the guide pipe 22 by normal driving of a driving device 70, or may be moved backwards and received in the guide pipe 22 and the housing 20 by reverse driving of the driving device 70.

As shown in FIG. 3, a second gasket 16 is mounted as a seal on a predetermined portion of the internal surface of the housing 20 to be in contact with the moving case 30. The second gasket 16 is configured to prevent the entry of water or other foreign substances into the housing 20 and the guide pipe 22.

In the instant case, the first camera 40 is located at a rear position in the moving case 30, and a rear-lateral photographing opening 32, which is an external photographing opening, is formed in the rear surface of the moving case 30 to be aligned with a lens 42 of the first camera 40 in the forward-backward direction thereof.

Accordingly, in the state in which the moving case 30 is drawn out of the guide pipe 22, the first camera 40 is configured for photographing the area surrounding the rear and the sides of the vehicle through the rear-lateral photographing opening 32.

Furthermore, a transparent lens 24 is mounted on the rear surface of the guide pipe 22 so that it is possible to monitor the area surrounding the rear and the sides through the lens 42 of the first camera 40 when the first camera 40 is located at the stowed position.

In more detail, when the moving case 30, in which the first camera 40 is accommodated, is moved into and received in the guide pipe 22, the lens 42 of the first camera 40 is aligned with the transparent lens 24 of the guide pipe 22 in the forward-backward direction thereof. Accordingly, in the turned-off state of the vehicle, the first camera 40 is configured for photographing the area surrounding the rear and the sides of the vehicle through the transparent lens 24, in the manner of a camera of a black box.

Furthermore, a second camera 50 is mounted in the moving case 30 to be located at a front position therein to photograph the ground in the area surrounding the sides of the vehicle (e.g., a lane of the road or the like), and a ground photographing opening 34, which is an external photographing opening, is formed in the lower surface of the front portion of the moving case 30 to be aligned with a lens 52 of the second camera 50.

Furthermore, a direction-indicating lens 36 is mounted on the external side surface of the moving case 30, and a direction-indicating lamp 60 is mounted in the moving case 30 to radiate light through the direction-indicating lens 36.

As described above, the first camera 40 for photographing the area surrounding the rear and the sides of the vehicle, the second camera 50 for photographing the ground in the area surrounding the sides of the vehicle, and the direction-indicating lamp 60 are compactly mounted in the moving case 30. Accordingly, it is not necessary to the mount the direction-indicating lamp and the second camera to the vehicle body or the door panel, thus facilitating the design and manufacture of the vehicle body and the door panel.

Furthermore, a driving device 70 is mounted to the housing 20 and the moving case 30 to linearly move the moving case 30 into or out of the guide pipe 22.

To the present end, the driving device 70 may include a motor 71, which is mounted to the lower portion of the housing 20, a connection frame 72, which has an external end portion connected to the moving case 30 and an internal end portion located in a lower open portion in the housing 20, a sector gear 73, which is mounted to the output shaft of the motor 71, and a rack gear 74, which is formed on the lower surface of the internal end portion of the connection frame 72 to be engaged with the sector gear 73.

Accordingly, when the sector gear 73 is rotated in the outward direction by rotation of the motor 71 in one direction, the rack gear 74 engaged with the sector gear 73 is moved linearly in the outward direction, and at the same time, the connection frame 72 is moved linearly in the outward direction thereof. As a result, the moving case 30 connected to the connection frame 72 is drawn out of the guide pipe 22, as shown in FIG. 4.

On the other hand, when the sector gear 73 is rotated in the inward direction by rotation of the motor 71 in the opposite direction, the rack gear 74 engaged with the sector gear 73 is moved linearly in the inward direction, and at the same time, the connection frame 72 is moved linearly in the inward direction thereof. As a result, the moving case connected to the connection frame 72 is received in the guide pipe 22, as shown in FIG.

To ensure rectilinear reciprocating movement of the connection frame 72 and the moving case 30, the connection frame 72 includes a slide step 75 formed on the internal end portion thereof, and the housing 20 has a slide groove 76 formed in the lower open portion therein to allow the slide step 75 to be linearly movably fitted therein.

Figure 6:
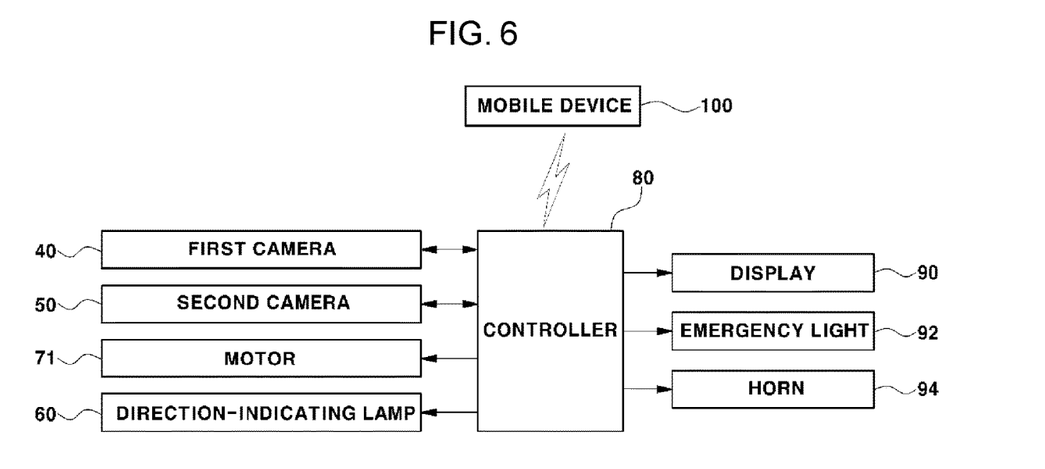
FIG. 6 is a control block diagram of the system for driving a digital side mirror for vehicles according to an exemplary embodiment of the present disclosure.

Furthermore, as shown in the control block diagram in FIG. 6, the system for driving a digital side mirror according to an exemplary embodiment of the present disclosure further includes a controller 80 for controlling driving of the motor 71 of the driving device 70 and the first camera 40 depending on whether the vehicle is in an ON state or an OFF state.

The controller 80 is configured to perform control so that the first camera 40 is maintained in an ON state for a predetermined amount of time after the vehicle is turned off in the state in which the moving case 30, in which the first camera 40 is mounted, is drawn out of the guide pipe 22.

Due to control for maintaining the ON state of the first camera 40, the image of the area surrounding the rear and the sides captured by the first camera 40 is displayed on the display 90 mounted in the interior of the vehicle for a predetermined amount of time after the vehicle is turned off, whereby an occupant may check for the presence of a risk factor (e.g., a motorcycle, a bicycle, or the like) while viewing the image of the area surrounding the rear and the sides displayed on the display 90, and may then safely get out of the vehicle.

Furthermore, the controller 80 is configured to apply a drive signal to the driving device 70 to move the moving case 30 into the guide pipe 22 when a predetermined time period elapses after the vehicle is turned off.

When the sector gear 73 is rotated in the inward direction by rotation of the motor 71 in the opposite direction in response to the drive signal applied to the driving device 70, the rack gear 74 engaged with the sector gear 73 is moved linearly in the inward direction, and at the same time, the connection frame 72 is moved linearly in the inward direction thereof. As a result, the moving case 30 connected to the connection frame 72 is received in the guide pipe 22.

Because the moving case 30 is moved backwards and received in the guide pipe 22 in the turned-off state of the vehicle, e.g., the parked state thereof, it is possible to avoid the risk of damage to the first and second cameras 40 and 50 and the risk of theft thereof. Furthermore, it is possible to prevent contamination and malfunction of the first and second cameras 40 and 50.

Furthermore, the controller 80 is configured to perform control so that the ON state of the first camera 40 is further maintained for a predetermined amount of time after the moving case 30 is received in the guide pipe 22 by driving of the driving device 70.

Accordingly, even when the moving case 30 accommodating the first camera 40 is received in the guide pipe 22 after the vehicle is turned off, the first camera 40 may continue to photograph the area surrounding the rear and the sides of the vehicle for a predetermined amount of time through the transparent lens 24 of the guide pipe 22, whereby an occupant may check for the presence of a risk factor (e.g., a motorcycle, a bicycle, or the like) while viewing the image of the area surrounding the rear and the sides displayed on the display 90, and may then safely get out of the vehicle.

Furthermore, the controller 80 is configured to turn on the first camera 40 upon receiving a mobile operation signal generated by operation of a mobile device 100 by a user, who is located at a remote place, in the state in which the vehicle is parked and to transmit the image of the area surrounding the vehicle captured through the transparent lens 24 of the guide pipe 22 by the first camera 40 to the mobile device 100 of the user, in the manner of a camera of a black box.

To the present end, the controller 80 may be provided with a communication module configured for communicating with the mobile device 100.

Furthermore, the controller 80 is configured to perform control so that an emergency light is turned on or a horn is driven upon determining that a risk factor is present in the image of the area surrounding the vehicle captured through the transparent lens 24 of the guide pipe 22 by the first camera 40.

Accordingly, the user determines whether a risk factor is present near to the vehicle while viewing the image of the area surrounding the vehicle transmitted to the mobile device 100 from the controller 80. The user transmits a signal for operating the emergency light or the horn to the controller 80 using the mobile device 100 upon determining that a risk factor is present near to the vehicle, and the controller 80 performs control so that the emergency light 92 is turned on or the horn 94 is driven in response to the received signal.

Accordingly, in the case in which a risk factor is present near to the vehicle in the state in which the vehicle is parked (e.g., in the case in which a stranger approaches the vehicle in a dark place), the user may chase away the risk factor by operating the emergency light or the horn before getting in the vehicle. As a result, vehicle theft or a similar incident may be prevented, and the user may safely get in the vehicle in a dark parking lot or the like.

Hereinafter, the operational process of the system for driving a digital side mirror according to an exemplary embodiment of the present disclosure configured as described above will be described in more detail.

Figure 7:
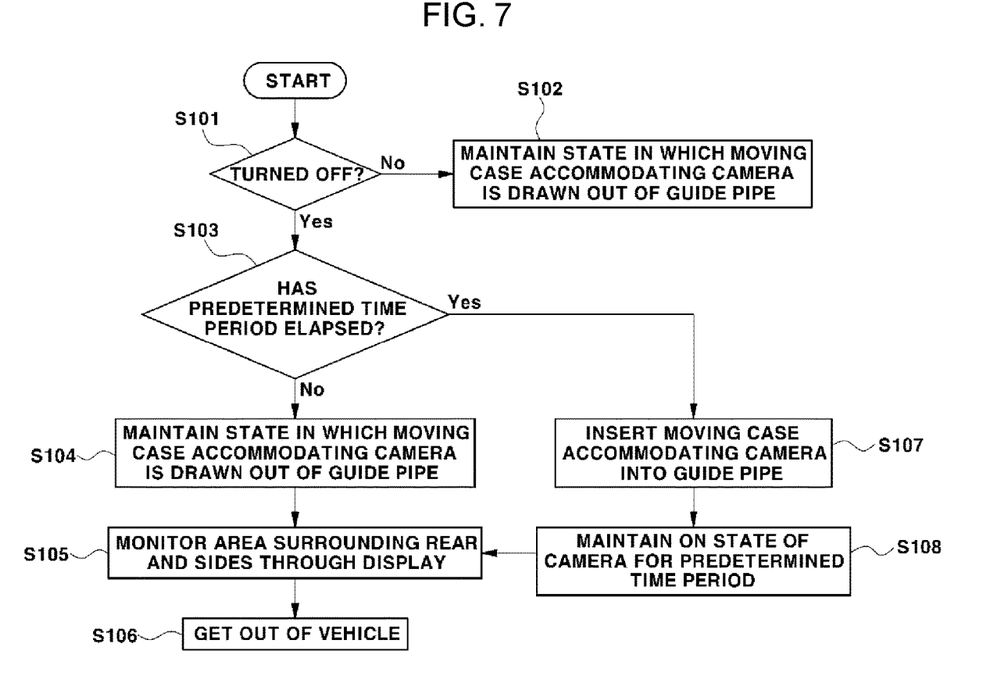
FIG. 7 and FIG. 8 are flowcharts showing the operational process of the system for driving a digital side mirror for vehicles according to an exemplary embodiment of the present disclosure.
Figure 8:
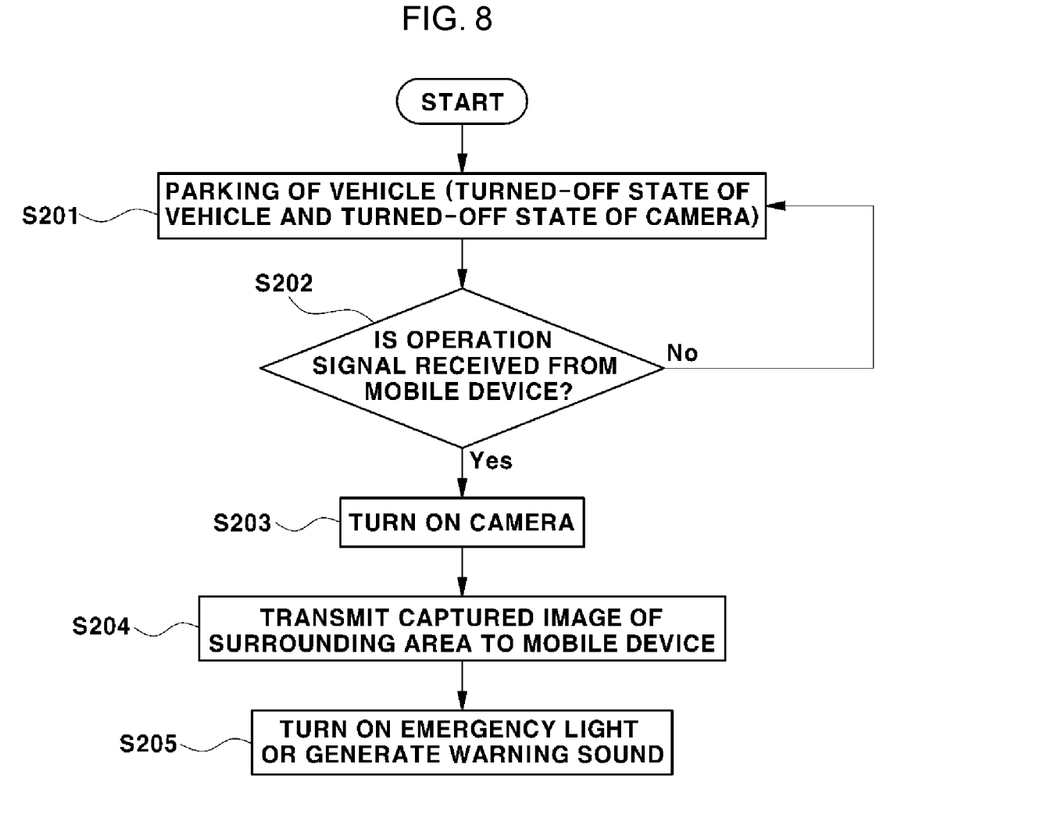

FIG. 7 and FIG. 8 are flowcharts showing the operational process of the system for driving a digital side mirror for vehicles according to an exemplary embodiment of the present disclosure.

When the vehicle is turned on, the controller 80 transmits a drive signal to the driving device 70, and performs control so that the first and second cameras 40 and 50 are turned on.

When the sector gear 73 is rotated in the outward direction by rotation of the motor 71 of the driving device 70 in one direction, the rack gear 74 engaged with the sector gear 73 is moved linearly in the outward direction, and at the same time, the connection frame 72 is moved linearly in the outward direction thereof. As a result, the moving case 30 connected to the connection frame 72 is drawn out of the guide pipe 22.

The first camera 40 accommodated in the moving case 30 photographs the area surrounding the rear and the sides of the vehicle through the rear-lateral photographing opening 32 formed in the rear surface of the moving case 30, and the captured image of the area surrounding the rear and the sides is displayed on the display mounted in the interior of the vehicle so that the driver and the passenger can view the same. Accordingly, the driver may safely drive the vehicle while viewing the image of the area surrounding the rear and the sides displayed on the display.

In the present state, the controller 80 determines whether the vehicle is turned off (S101).

Upon determining that the vehicle is in an ON state, the controller 80 maintains the state in which the moving case 30 accommodating the first camera 40 is drawn out of the guide pipe 22 (S102).

On the other hand, upon determining that the vehicle is in an OFF state, the controller 80 determines whether a predetermined time period has elapsed since the vehicle was turned off (S103).

Upon determining that the predetermined time period has not elapsed, the controller 80 does not apply a drive signal to the driving device 70 for the predetermined time period, and performs control so that the ON state of the first camera 40 is maintained for the predetermined time period.

Accordingly, the moving case 30 is maintained in the state of being drawn out of the guide pipe 22 for the predetermined time period after the vehicle is turned off (S104).

In the present state, the image of the area surrounding the rear and the sides captured by the first camera 40 is displayed on the display 90 mounted in the interior of the vehicle, and thus an occupant may monitor the area surrounding the rear and the sides using the image thereof displayed on the display 90.

In other words, the image of the area surrounding the rear and the sides captured by the first camera 40 is displayed on the display 90 mounted in the interior of the vehicle, whereby an occupant may check for the presence of a risk factor (e.g., a motorcycle, a bicycle, or the like) while viewing the image of the area surrounding the rear and the sides displayed on the display 90, and may then safely get out of the vehicle (S106).

Upon determining that the predetermined time period has elapsed since the vehicle was turned off (Yes in S103), the controller 80 applies a drive signal to the driving device 70 to move the moving case 30 into the guide pipe 22.

When the sector gear 73 is rotated in the inward direction by rotation of the motor 71 in the opposite direction in response to the drive signal applied to the driving device 70, the rack gear 74 engaged with the sector gear 73 is moved linearly in the inward direction, and at the same time, the connection frame 72 is moved linearly in the inward direction thereof. As a result, the moving case 30 connected to the connection frame 72 is received in the guide pipe 22 (S107).

Since the moving case 30 is moved backwards and received in the guide pipe 22 in the turned-off state of the vehicle, e.g., the parked state thereof, it is possible to avoid the risk of damage to the first and second cameras 40 and 50 mounted in the moving case and the risk of theft thereof. Furthermore, it is possible to prevent contamination and malfunction of the first and second cameras 40 and 50.

Furthermore, the controller 80 performs control so that the ON state of the first camera 40 is further maintained for a predetermined amount of time after the moving case is received in the guide pipe 22 by driving of the driving device 70 (S108).

Accordingly, even when the moving case 30 accommodating the first camera 40 is received in the guide pipe 22 after the vehicle is turned off, the first camera 40 may continue to photograph the area surrounding the rear and the sides of the vehicle for a predetermined amount of time through the transparent lens 24 of the guide pipe 22.

Therefore, the image of the area surrounding the rear and the sides captured by the first camera 40 is continuously displayed on the display 90 mounted in the interior of the vehicle, and thus an occupant may monitor the area surrounding the rear and the sides using the image thereof displayed on the display 90 (S105).

In other words, the image of the area surrounding the rear and the sides captured by the first camera 40 is displayed on the display 90 mounted in the interior of the vehicle, whereby an occupant may check for the presence of a risk factor (e.g., a motorcycle, a bicycle, or the like) while viewing the image of the area surrounding the rear and the sides displayed on the display 90, and may then safely get out of the vehicle (S106).

Meanwhile, in the state in which the vehicle is parked (e.g., the turned-off state of the vehicle and the turned-off state of the camera), the controller 80 determines whether an operation signal is received from the mobile device 100 (S201 and S202).

When a mobile operation signal generated by operation of the mobile device 100 by a user, who is located at a remote place, is transmitted to the controller 80 in the state in which the vehicle is parked, the controller 80 turns on the first camera 40 (S203) and transmits the image of the area surrounding the vehicle captured through the transparent lens 24 of the guide pipe 22 by the first camera 40 to the mobile device 100 of the user, in the manner of a camera of a black box (S204).

Accordingly, the user determines whether a risk factor is present near to the vehicle while viewing the image of the area surrounding the vehicle transmitted to the mobile device 100 from the controller 80. The user transmits a signal for operating the emergency light or the horn to the controller 80 using the mobile device 100 upon determining that a risk factor is present near to the vehicle, and the controller 80 performs control so that the emergency light 92 is turned on or the horn 94 is driven (S205).

Accordingly, in the case in which a risk factor is present near to the vehicle in the state in which the vehicle is parked (e.g., in the case in which a stranger approaches the vehicle in a dark place), the user may chase away the risk factor by operating the emergency light or the horn before getting in the vehicle. As a result, vehicle theft or a similar incident may be prevented, and the user may safely get in the vehicle in a dark parking lot or the like.

As is apparent from the above description, the present disclosure has the following effects.

First, in the turned-on state of the vehicle, the moving case accommodating the camera, which is a main component of the digital side mirror, is moved forwards a predetermined distance from the guide pipe in the outward direction of the vehicle panel, and thus the camera may easily photograph the area surrounding the rear and the sides of the vehicle.

Second, since the moving case accommodating the camera is moved backwards and received in the guide pipe in the turned-off state of the vehicle, e.g., the parked state thereof, it is possible to avoid the risk of damage to the camera and the risk of theft thereof. Furthermore, it is possible to prevent contamination and malfunction of the camera.

Third, even when the moving case accommodating the camera is received in the guide pipe after the vehicle is turned off, the camera is controlled to photograph the area surrounding the rear and the sides of the vehicle through the transparent lens of the guide pipe, whereby an occupant may safely get out of the vehicle while monitoring the area surrounding the rear and the sides using the image thereof displayed on a display mounted in the interior of the vehicle.

Fourth, in the state in which the vehicle is parked, the camera is controlled to photograph the area surrounding the rear and the sides of the vehicle in response to operation of a mobile device by a user, in the manner of a camera of a black box, and the image of the area surrounding the rear and the sides captured by the camera is transmitted to the mobile device so that the user can observe a risk factor present near to the vehicle.

Fifth, in the case in which a risk factor is present near to the vehicle, the user may chase away the risk factor by turning on an emergency light or operating a horn, preventing vehicle theft or a similar incident.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A system for driving a digital side mirror for a vehicle, the system comprising:
   a housing mounted to a panel of the vehicle;
   a guide pipe extending from the housing to protrude outside the panel of the vehicle;
   a moving case inserted into the housing and the guide pipe to be slidably movable forward and backward directions;
   a first camera mounted in the moving case to photograph an area surrounding a rear and sides of the vehicle; and
   a driving device mounted to the housing and engaged to the moving case to linearly move the moving case into or out of the guide pipe,
   wherein the guide pipe is provided with a transparent lens to allow the first camera to photograph the area surrounding the rear and the sides of the vehicle through the transparent lens when the moving case is received in the guide pipe, and
   wherein the transparent lens is mounted on a rear surface of the guide pipe to be aligned with a lens of the first camera in a forward-backward direction to enable the first camera to photograph the area surrounding the rear and the sides in a state in which the moving case is moved backwards and received in the guide pipe.

2. The system of claim 1, wherein the moving case includes an external photographing opening formed in a rear surface thereof to define a field of view of a lens of the first camera.

3. The system of claim 1, further including a second camera mounted in the moving case to photograph a ground in an area surrounding the sides of the vehicle.

4. The system of claim 3, wherein the moving case includes an external photographing opening formed in a lower surface thereof to define a field of view of a lens of the second camera.

5. The system of claim 1, further including a direction-indicating lens mounted on an external side surface of the moving case.

6. The system of claim 5, further including a direction-indicating lamp mounted in the moving case to radiate light through the direction-indicating lens.

7. The system of claim 1, further including a first gasket mounted between a periphery of the guide pipe and the panel of the vehicle to ensure watertightness and prevent introduction of foreign substances therebetween.

8. The system of claim 1, wherein the driving device includes:
   a motor mounted to a lower portion of the housing;
   a connection frame including an external end portion connected to the moving case and an internal end portion located in a lower open portion in the housing;
   a sector gear mounted to an output shaft of the motor; and
   a rack gear formed on a lower surface of the internal end portion of the connection frame to be engaged with the sector gear.

9. The system of claim 8,
   wherein the connection frame includes a slide step formed on the internal end portion, and
   wherein the housing includes a slide groove formed in the lower open portion to allow the slide step to be linearly movably fitted therein.

10. A system for driving a digital side mirror for a vehicle, the system comprising:

a housing mounted to a panel of the vehicle;

a guide pipe extending from the housing to protrude outside the panel of the vehicle;

a moving case inserted into the housing and the guide pipe to be slidably movable forward and backward directions;

a first camera mounted in the moving case to photograph an area surrounding a rear and sides of the vehicle;

a driving device mounted to the housing and engaged to the moving case to linearly move the moving case into or out of the guide pipe; and a controller electrically connected to the driving device and the first camera and configured to control driving of the driving device and the first camera depending on whether the vehicle is in an ON state or an OFF state, wherein the guide pipe is provided with a transparent lens to allow the first camera to photograph the area surrounding the rear and the sides of the vehicle through the transparent lens when the moving case is received in the guide pipe.

11. The system of claim 10, wherein the controller is configured to perform control so that the first camera is maintained in an ON state for a predetermined amount of time after the vehicle is turned off in a state in which the moving case including the first camera mounted therein is drawn out of the guide pipe.

12. The system of claim 11, wherein the controller is configured to apply a drive signal to the driving device to move the moving case into the guide pipe when a predetermined time period elapses after the vehicle is turned off.

13. The system of claim 12, wherein the controller is configured to perform control so that the ON state of the first camera is further maintained for a predetermined amount of time after the moving case is moved into the guide pipe by driving of the driving device.

14. The system of claim 10, wherein the controller is configured to turn on the first camera in response to a mobile operation signal generated by operation of a mobile device by a user in a parked state of the vehicle and to transmit an image of an area surrounding the vehicle captured by the first camera to the mobile device of the user.

15. The system of claim 14, wherein the controller is configured to perform control so that an emergency light is turned on or a horn is driven upon determining that a risk factor is present in the image of the area surrounding the vehicle captured by the first camera.

16. The system of claim 1, further including a second gasket mounted as a seal on a predetermined portion of the internal surface of the housing to be in contact with the moving case to ensure watertightness and prevent introduction of foreign substances therebetween.

17. A method of controlling a system for driving a digital side mirror for a vehicle, the method comprising:

providing a housing mounted to a panel of the vehicle;

providing a guide pipe extending from the housing to protrude outside the panel of the vehicle;

providing a moving case inserted into the housing and the guide pipe to be slidably movable forward and backward directions;

providing a first camera mounted in the moving case to photograph an area surrounding a rear and sides of the vehicle;

providing a driving device mounted to the housing and engaged to the moving case to linearly move the moving case into or out of the guide pipe;

providing the guide pipe with a transparent lens to allow the first camera to photograph the area surrounding the rear and the sides of the vehicle through the transparent lens when the moving case is received in the guide pipe; and maintaining, by a controller, the first camera an ON state for a predetermined amount of time after the vehicle is turned off in a state in which the moving case including the first camera mounted therein is drawn out of the guide pipe.

18. The method of claim 17, wherein the controller is configured to apply a drive signal to the driving device to move the moving case into the guide pipe when a predetermined time period elapses after the vehicle is turned off.

19. The method of claim 18, wherein the controller is configured to perform control so that the ON state of the first camera is further maintained for a predetermined amount of time after the moving case is moved into the guide pipe by driving of the driving device.

* * * * *